Aug. 3, 1965   KIYOSHI INOUE   3,198,675
ELECTRIC DISCHARGE HEAT TREATMENT OF METALS IN ELECTROLYTES
Original Filed Aug. 15, 1960   5 Sheets-Sheet 1

KIYOSHI INOUE
INVENTOR

BY  Karl J. Ross
AGENT

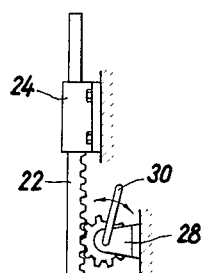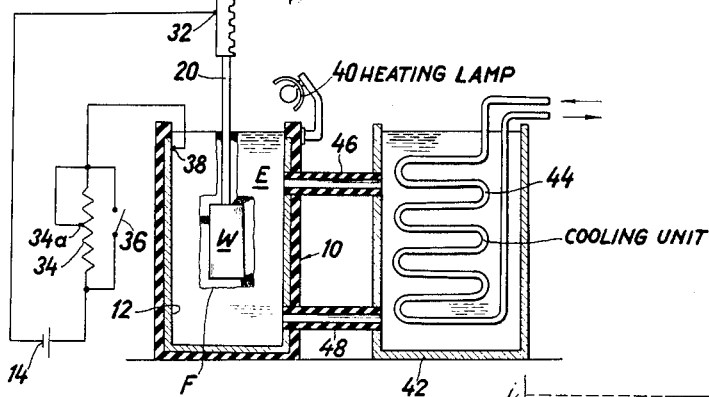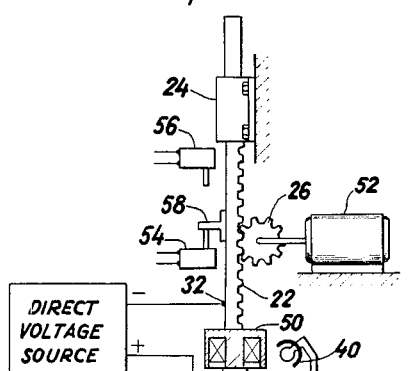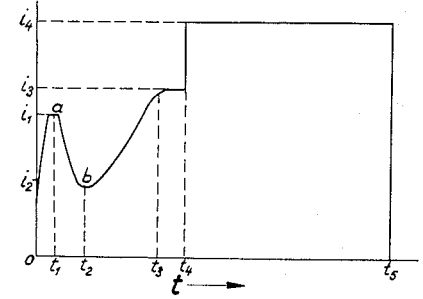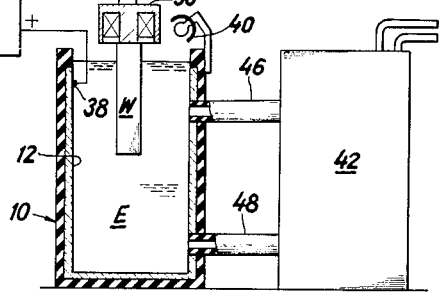

United States Patent Office 3,198,675
Patented Aug. 3, 1965

3,198,675
ELECTRIC DISCHARGE HEAT TREATMENT OF
METALS IN ELECTROLYTES
Kiyoshi Inoue, 182 Yoga Tamagawa Setagaya-ku
Tokyo, Japan
Original application Aug. 15, 1960, Ser. No. 49,625.
Divided and this application Jan. 2, 1963, Ser.
No. 256,790
8 Claims. (Cl. 148—13)

This is a division of application Serial No. 49,625, filed August 15, 1960, now abandoned.

This invention relates to improvements in the art of heating metal objects by creating an electric discharge at the surfaces of the object immersed in an electrolyte solution. The invention is herein illustratively described by reference to the presently preferred embodiments thereof; however it will be recognized that certain modifications and changes therein with respect to details may be made without departing from the essential features involved.

Among the numerous useful applications for this general heating technique may be listed tempering, annealing or other heat treating of metal objects, thermal fabrication (viz. pressure forming or melting and molding of metal), disinfecting of surgical instruments and the like, melting of metal objects such as in the manufacture of metal alloys, etc. The basic principle inherent in the process of heating metal objects in an electrolyte by an electric discharge process is disclosed in "Electrical Review," Februray 1, 1929.

Chiefly the present invention is concerned with apparatus and method improvements which so increase the efficiency and effectiveness of the basic process as to render the same commercially feasible and versatileiy practicable for a number of useful applications heretofore undeveloped.

Furthermore this invention provides more reliable and consistent results than heretofore, especially in heat treating, and affords new and useful means and techniques of control to that end. The invention also provides automatic control arrangements and apparatus by which the basic techniques are adaptable to various production applications.

Another object is to provide a technique and apparatus for heat treating wherein the heating and subsequent cooling steps are performed rapidly, systematically and without separate handling of the object. In this regard, the object is both heated and immediately cooled in the same apparatus, indeed in the same liquid medium. Consequently certain apparatus simplifications are attainable along with better and more consistently reliable results.

A specific object is to provide an apparatus and technique wherein energy consumed in electrolysis and in unstable discharge at the object surfaces both during and upon completion of immersion of the object are held at a minimum. Higher electro-thermal efficiency in the process, lesser metal erosion and reduced consumption of electrolyte are thereby attained.

A further object is to provide a technique and a means for increasing energy transfer to the electrolytic heating cell on a controlled or automatic basis, predetermined as to amount and in accordance with requirements of efficiency.

A related object is to determine and provide electrolyte solution yielding much higher efficiency than heretofore.

A specific object hereof is a technique and means by which, using an insulating topping liquid on the electrolyte liquid, heat is conserved, and related arrangements may thereby be provided for progressively heating and cooling metal objects by moving them, either in rotation or in translation along a prescribed path into and through the electrolyte and thereupon into and through the insulating liquid. Consequently the process may be applied to uninterrupted rapid-production heat treatment inasmuch as it becomes possible to cool the heated objects in the liquid environment without removing the electrolyte voltage.

Still another specific object is to provide an efficient and reliable metal molding or forming apparatus wherein the electrolytically heated metal objects may be subjected to forming pressures or may be melted and molded while immersed in the electrolyte and which being held at forming temperatures therein. Thus thermoforging or casting may be performed in essentially one operation with resultant economies. Other specific objects include an efficient and practicable alloy manufacturing apparatus by which alloys, free of oxidation and atmospheric contamination, are formable in any of different predetermined ingot (or utilitarian) shapes and sizes and with controlled cooling in a liquid (electrolyte) medium inherent to the melting process itself.

These and other objects along with the novel features and advantages of the improvements comprising this invention will become evident as the description proceeds with reference to the accompanying drawings.

FIGURES 4(A) and (B) are enlarged and exaggerated sectional views depicting a discharge phenomenon occurring in such apparatus.

Figure 5:
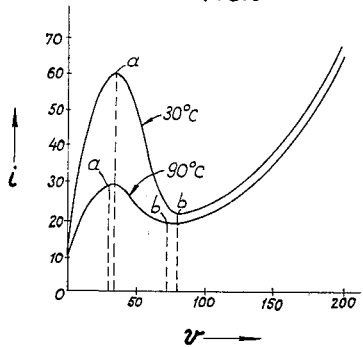

FIGURE 5 is a graph showing the voltage and current relationship in an electrolytic heating cell at different electrolyte temperatures with a given electrolyte and work surface exposed to the electrolyte.

Figure 6:
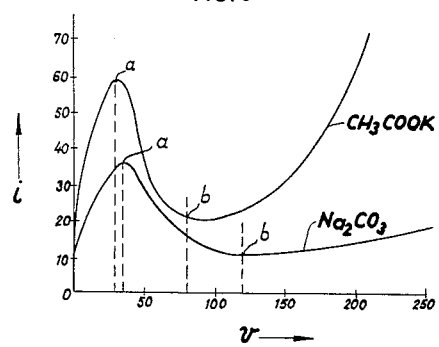

FIGURE 6 is a graph showing the current and voltage relationship in an electrolytic heating cell using a conventional electrolyte and, by comparison, an electrolyte representing one aspect of the present improvements.

FIGURE 7 is a simplified side view of a work heating system illustrating certain features of the invention.

FIGURE 8 is a graph showing the variation of current flow through the electrolytic cell as a function of time in the operation of the apparatus shown in FIGURE 7.

Figure 10:
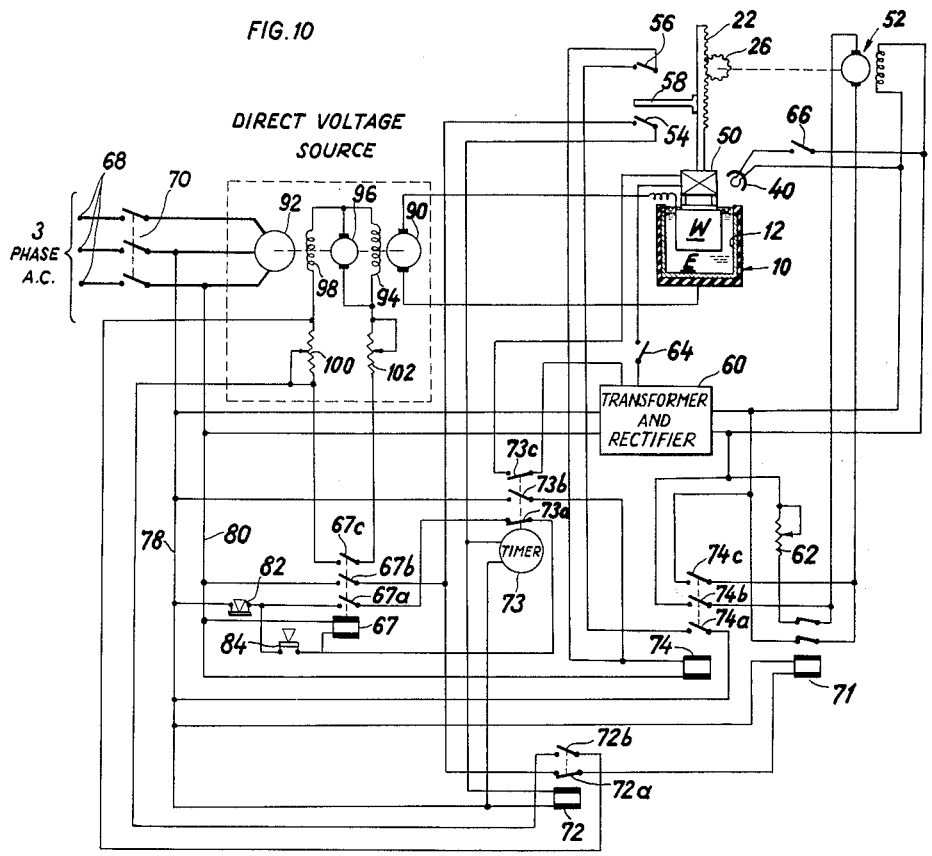

FIGURE 9 is a simplified side view of mechanical aspects of a more fully automated heat treatment apparatus according to this invention; and FIGURE 10 is a schematic diagram of the related electrical and electromechanical system of such apparatus.

Figure 11:
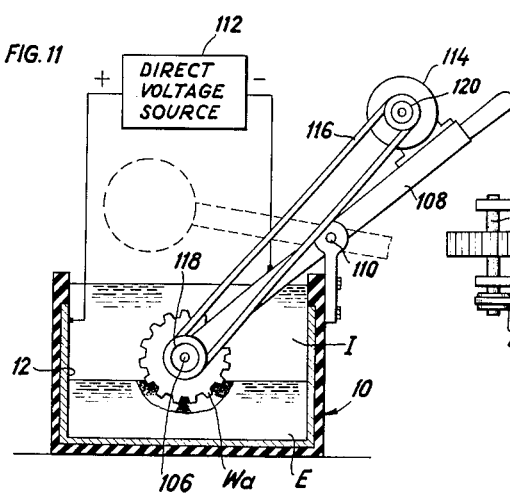
Figure 12:
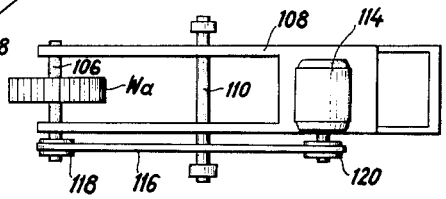

FIGURE 11 is a simplified side view of heat treating apparatus for application to annular or similar work objects which are rotatably mountable; and FIGURE 12 is a plan view thereof.

Figure 13:
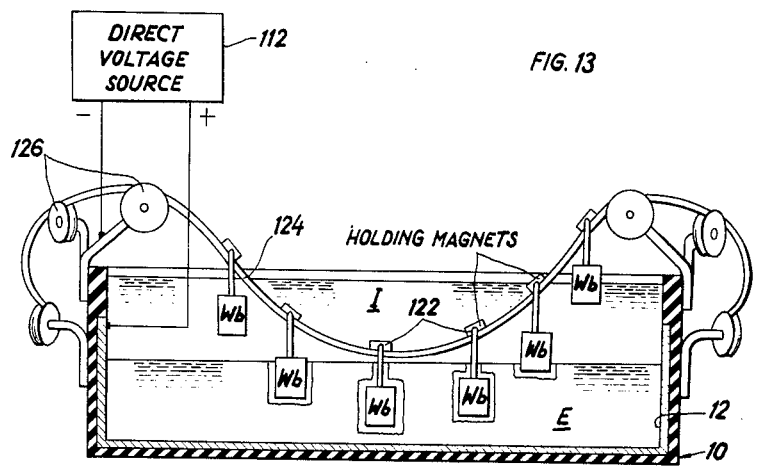
Figure 14:
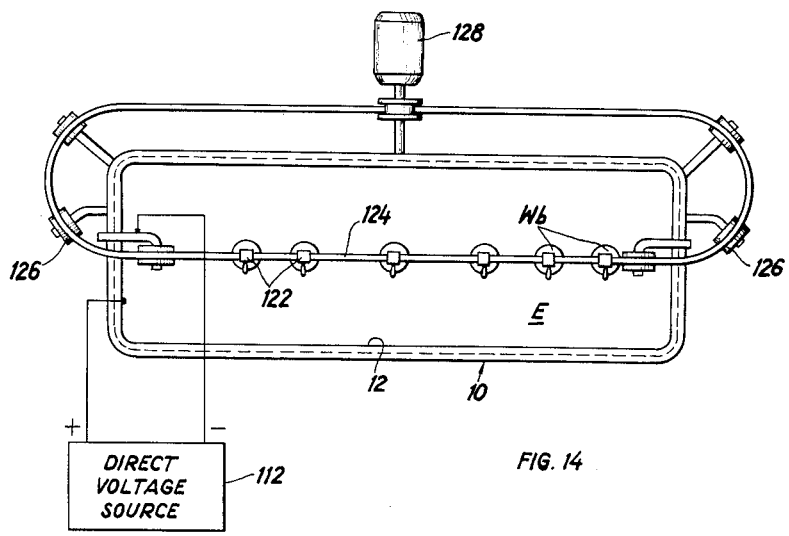

FIGURE 13 is a simplified side view of heat treating apparatus applying the principles of the apparatus of FIGURES 11 and 12 to processing a continuing succession of articles on a production basis; and FIGURE 14 is a plan view thereof.

Figure 15:
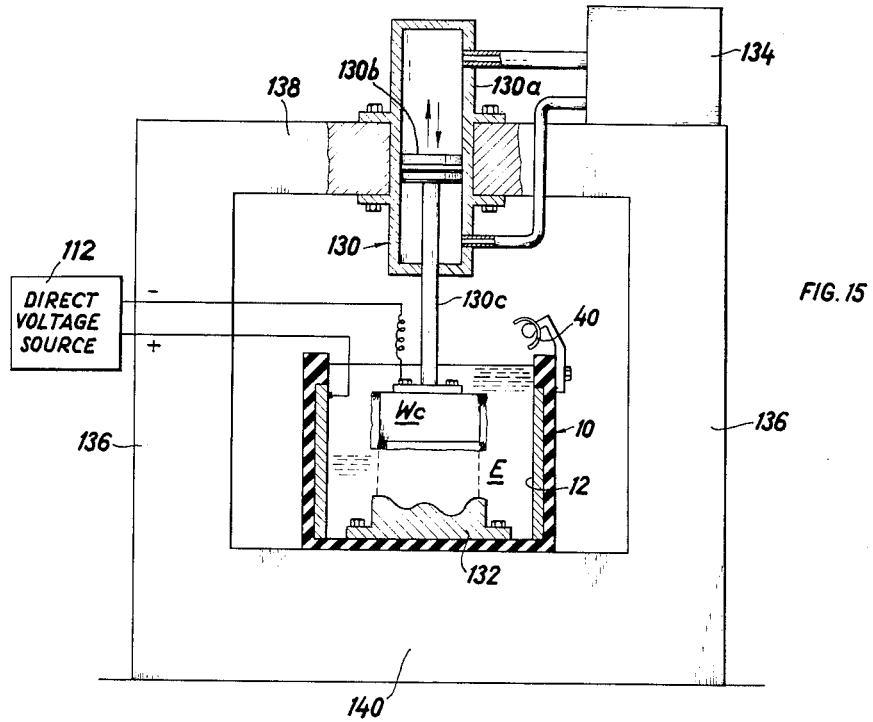

FIGURE 15 is a simplified side view of heat-forming apparatus employing feature of the invention.

Figures 16, 17:
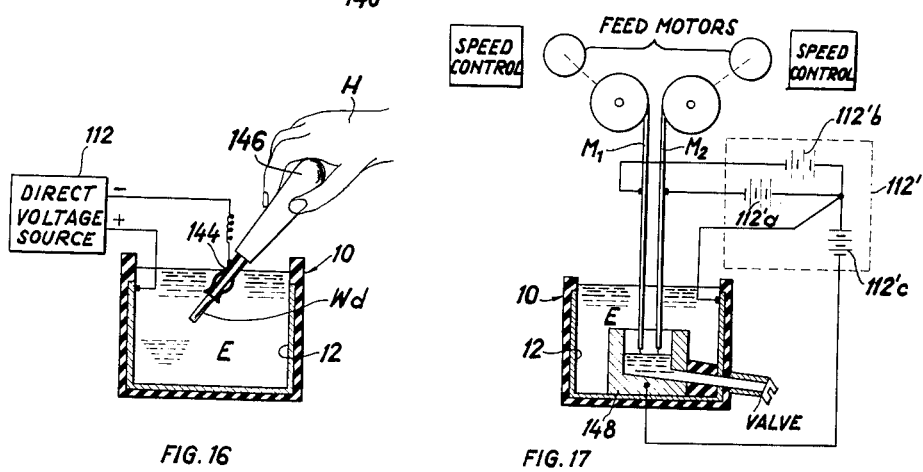

FIGURE 16 is a simplified side view of heat sterilizing apparatus embodying features of the invention.

FIGURE 17 is a simplified side view of metal casting apparatus employing the invention, in this case to manufacture cast alloys.

Further studies and experiments with electric discharge heating through an electrolyte have revealed certain principles and characteristics out of which have come certain conceptions and discoveries represented in the present improvements. When an electrically conductive work piece or metal object W is immersed or partially immersed in an electrolyte E in a container 10 having an opposing electrode such as the conductive liner 12 and voltage is applied from a direct voltage source 14, with the object W connected to the negative side and the liner electrode 12 to the positive side discharge current will flow through the electrolyte. An ammeter A connected in series and a voltmeter V connected in shunt in the external circuit measure the cell current $i$ and the applied voltage $v$. Current flow may be varied by a series-connected variable resistance 16. Certain relationships and characteristics are then observable in the system.

Figure 1:
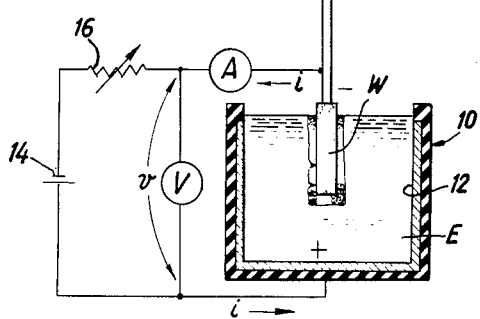
FIGURE 1 is a simplified and partially schematic side view showing of a basic apparatus arrangement for practicing electrolytic electric discharge heating.
Figure 2:
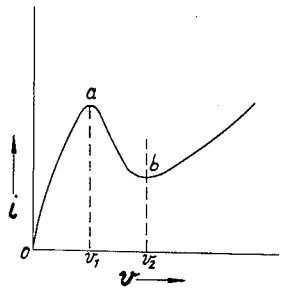
FIGURE 2 is a graph showing discharge current as a function of voltage in such apparatus.

For instance, as depicted in FIGURE 2, when voltage is increased from zero progressively through a range of values, as by reducing the size of resistance 16, current $i$ initially rises at a substantially linearly proportional rate. A point $a$ is ultimately reached at applied voltage $v_1$ at which any further progressive increase of voltage causes a progressive reduction of current, until a second point $b$ is reached. Thereupon a further increase of voltage causes a further increase of current, although at a somewhat lesser rate of increase than that occurring in the first stage. The cresting of the current characteristic of such a cell is explainable from the ionic reactions producing an increasing insulative blanketing of gas molecules on the work surface as electrolysis current is progressively increased. Eventually (at point $a$) the increasing blanketing is sufficient to progressively reduce the current flow as voltage further increases. This represents a second stage of the current characteristic, between points $a$ and $b$. At point $b$ the flow of electrolytic current as such is virtually cut off by the insulating gas layer.

The ultimate stage, i.e., beyond point $b$, represents still another condition and the one of particular interest herein. Current $i$ will again start to increase as voltage increases due to the fact that the escaping gas, not now being replenished, leaves localized areas of the work surface exposed directly to the electrolyte. Current flow will then be concentrated in these areas, producing intense heat and consequent vaporization of electrolyte. Initially these randomly distributed areas are relatively large and occur infrequently, but as the process is extended farther along into the ultimate stage beyond point $b$ through a further increase of voltage more and more areas of smaller and smaller size occur. The significant phenomenon now occurring is that in this ultimate and the presently useful stage of the current characteristic, current flows through the vaporized electrolyte not largely as an electrolytic current but primarily as a gaseous electric discharge and heats the entire work piece, the vapors being constantly replenished and being additive to the gaseous blanket formed by electrolysis in forming the insulative blanket. Moreover the heating discharge condition being described is stable, whereas that occurring in the first and second stages, to point $b$, is essentially unstable.

Figure 3:
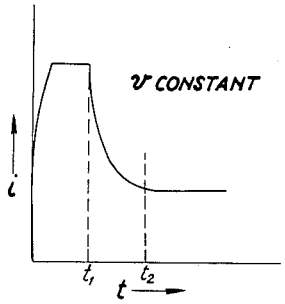
FIGURE 3 is a graph showing discharge current as a function of time, at a given voltage, in such apparatus.

As shown in FIGURE 3, there is also a time factor to be considered in the process. When a constant area of the work piece is first exposed to the electrolyte at a constant applied voltage selected at a value which will produce ultimately a discharge condition in the stable discharge stage or heating region (i.e., beyond point $b$ in FIGURE 2) there is a time lag in reaching a stable or quasi-stable condition. First the current $i$ rises very rapidly to a certain value determined by the electrolytic cell resistance, whereupon it levels off for a time. During this time the gas blanket builds up until, at time $t_1$, its increasing insulating effect causes a progressive decrease of current. This decrease continues until, at time $t_2$, the now-reduced electrolytic current, hence the reduced generation of blanketing gas is insufficient to fully replenish the gas coating in areas as the gas escapes, so that current flow now levels off and even slightly increases due to the gaseous-electric discharges occurring increasingly in these different exposed areas on the work piece.

Figure 4:
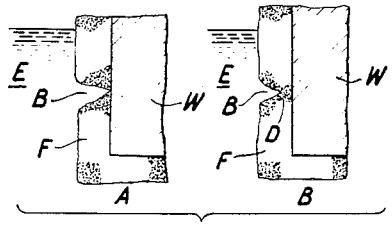

Referring to FIGURE 4, something of the phenomena occurring during the unstable and stable discharge stages (i.e., in FIGURE 2 from $a$ to $b$ and from $b$ on, respectively) may be appreciated which influence the choice of electrolyte. In this figure the gaseous blanket or layer F made up of electrolytically generated gas molecules is breached in localized areas and the electrolyte flows into contact, as at B (FIGURE 4A), with the exposed surface of work piece W. As previously indicated this gives rise to concentrated current flow and intense heating, producing vapors of the electrolyte solvent (usually water) and an ensuing gaseous discharge D (FIGURE 4B). An electrolyte of high viscosity and high specific gravity less readily surges through the briefly formed gap or break in film F than one of low viscosity and specific density, in order to reach the work piece surface. Also, the smaller the cross section of the contacting finger of electrolyte B, the larger the current density therein when the contact is formed, at a given applied cell voltage and electrical resistivity of the electrolyte. In other words, for a given total current flow through the electrolyte to the total work piece immersed therein, the higher the electrolyte viscosity the lower the applied voltage can be, and thereby the lower the power requirement, in order to attain a certain heating temperature.

It will further be seen that the energy supply in the evaporation stage in area B preliminary to producing discharge D is almost wholly consumed in producing evaporation, and contributes little to heating the work piece. The ensuing electric discharge D creates the heat. Moreover, the voltage drop along the discharge, hence the amount of heat thus generated is virtually independent of discharge gap length, i.e., gas film thickness, due to the well known characteristic of a gaseous electric discharge generally.

Through the foregoing analysis, which has been experimentally verified, it will be evident that the properties of the electrolyte determine the thickness of the gas blanketing film F and consequently the supply voltage necessary in order to produce a given value of current. Thus, it will be recognized that the amount of energy required to bring the heating cell through the initial electrolysis stage i.e., from current equals zero to point $a$ (FIGURE 2), and through the "unstable discharge" stage, i.e., from $a$ to $b$, to the stable discharge stage where heating is done as a function of electrolyte viscosity and resistivity. The greater this energy requirement, the lower the heating efficiency. In order to minimize this energy "loss" the electrolyte should have a high viscosity and a low electrical resistivity.

Temperature of the electrolyte is also found to be a factor in determining heating efficiency of the apparatus. Referring to FIGURE 5, the effects of temperature on the interrelationship between cell voltage and current are illustrated. The two graphs represent the example of potassium acetate working at 30° C. in one case and at 90° C. in the other case. Heating the electrolyte to 90° C. proved to reduce the power consumption during the "non-productive" electrolyzing stage to approximately half that when the electrolyte was maintained at slightly above room temperature, i.e., 30° C., with other conditions remaining the same.

In accordance with one feature and aspect of this invention the preferred electrolyte for the process is potassium acetate ($CH_3COOK$) solution. This compares with known electrolytes heretofore used in the process, such as sodium carbonate solution, as shown in FIGURE 6. From this graph it will be seen that a thermal efficiency with potassium acetate of thirty to forty percent is attainable, which is from two to five times higher under working conditions than that realized when sodium carbonate is used.

Another feature resides in the novel technique for correspondingly increasing the thermal efficiency even with formerly used electrolytes, such as sodium carbonate. This is achieved by adding gelatine or starch so as to materially raise the viscosity of the electrolyte. It is further improved by adding and mixing into the solution powdered conductive material in sufficient quantity to materially lower the electrical resistivity.

Still other features will be evident in the basic apparatus embodiment depicted in form and mode of operation in FIGURES 7 and 8.

In FIGURE 7 the work piece W is suspended on a meltable wire 20 from the vertically disposed and movable gear rack 22 guided in a stationary support 24 and actuated for vertical movement therein by the pinion 26 which is rotated on a fixed support 28 by means of the operating lever 30. The negative side of the voltage source 14 is connected at 32 to the lower end of the rack 22. The positive side of source 14 is connected through the adjustable resistance 34, by-passed by the switch 36, to the electrode 12 comprising a liner for the electrolyte container, at 38.

The surface of the electrolyte in the container is heated, such as by means of the infrared lamp 40, to an elevated temperature at least as high as in the range between 70° C. and 100° C. Below its heated surface the electrolyte is kept at a substantially uniform reduced temperature by circulating it through a cooling heat exchanger 42 comprising the separate container having within it a cooling coil 44 suitably supplied with cooling fluid from a source not shown. As the electrolyte surrounding the work piece W becomes warm it is drawn off by convection through the outlet pipe 46 into the cooling chamber 42 wherein it encounters the cooling coil 44 and, by convection, settles in the container 42 and eventually returns through the passage 48 to the electrolyte cell 10. Flow of coolant to the coil 44 is controlled so as to maintain the temperature within the cell 10 at the appropriate value for cooling the work piece W for heat treatment purposes, following its heating by means of the discharge process. In other words, the electrolyte E is maintained at the requisite tempering or cooling temperature, and this may be done by suitable automatic controls which determine the flow of coolant to the coil 44 or which, if necessary, increase or decrease the rate of circulation of the electrolyte through the heat exchanger 42, or otherwise. Such temperature control is readily accomplished by any of different known techniques.

Normally the switch 36 is in the open position. The value of resistance 34 is set, by adjusting the slider 34a, so that the voltage applied between the work piece W and opposing electrode 12 from the source 14, taking into account the voltage drop incurred in the resistance 34, will be sufficient to carry the process of discharge through the initial electrolysis stage and also preferably through the unstable discharge stage (i.e., to point b in FIGURE 2). However, the voltage should not be so high that any part of the work piece in process of being lowered or immersed in the electrolyte is heated to a temperature higher than the required heating temperature for the entire work piece when it is fully immersed in the final or ultimate heating operation for heat treatment purposes. The deliverable voltage of source 14 itself is chosen so that with the switch 36 closed and the resistance 34 thus by-passed, the resultant flow of current through the cell will heat the work piece to the required temperature for heat treatment purposes, with the work piece fully immersed.

With the apparatus ready for operation, the handle 30 is turned in the proper direction in order to lower the work piece W gradually into the electrolyte bath E. FIGURE 8 illustrates the attendant variation of cell current as a function of time. Initially the current $i$ increases rapidly, approximately in proportion to the increase of surface area being presented to the electrolyte. The increase of current will terminate very quicky and the curve will crest and advance into the unstable discharge region between points $a$ and $b$ if the surface area thus presented is small. The same will happen even with a relatively large surface area when the surface of the electrolyte is heated to a comparatively high temperature as described previously. Thus, if the surface of the electrolyte is preheated, as by means of the infrared lamp 40, the creasting current $i_1$ will be only one-third to one-half as much as it would be without preheating, thereby conserving energy in advancing the process to the final or stabilized heating discharge stage.

When the unstable discharge stage terminates as at time $=t_2$, the current has decreased to the value $i_2$ at point $b$ and further lowering of the work piece into the electrolyte, exposing larger surface areas thereof, will result in increased current flow until the time $t_3$ is reached when the work piece is totally submerged in the electrolyte. At this point the current curve levels out and will remain stable at the value $i_3$. Then, or at a later time, such as time $t_4$, the switch 36 is closed, thereby by-passing the resistance 34 and applying the full voltage of source 14 to the cell. The current will then rise abruptly to the value $i_4$ and will remain at this value while the work piece is heated to the necessary temperature for purposes of the process.

It will be noted that a part of the suspension wire 20 is also immersed in the electrolyte E. This portion of the wire is thus heated in the same manner as the heating of the work piece and, by proper choice of wire material and cross section, melts through at the appropriate time in order to drop the work piece W into the electrolyte for purposes of cooling. This is designed to occur when the work has reached the proper temperature for heat treatment purposes, and since the cooling process immediately follows, the total heat treatment process is accomplished in a very short period of time. As previously mentioned, the temperature of the electrolyte maintained by the heat exchanger 42 is established at the proper reduced value, which is substantially below that of the electrolyte surface layer, for the cooling phase of the heat treatment process. When the work piece drops into the electrolyte, the current is switched off by disconnecting the source 14.

Referring to the embodiment shown in FIGURES 9 and 10, parts which correspond to those in preceding figures bear similar reference characters. Work piece W is held on supporting rack 22 by the electromagnet 50 for lowering the work piece into electrolyte E and suspending it there while being heated. Motor 52 drives pinion 26 to raise and lower the rack and electromagnet. Lower and upper limit switches 54 and 56 connected in a control circuit to be described and actuatable by an arm 58 on rack 22 for establishing the vertical travel limits of the rack and electromagnet. Motor 52 is of the reversible direct-current type energized by transformer-rectifier unit 60 through a reversing circuit comprising the pair of switches of relay 71 in one branch, and the pair of switches 74b and 74c of relay 74 in another branch of the circuit. Adjustable, speed control resistance 62 in the first-mentioned branch reduces the motor energizing current to a suitable value for lowering the work piece W into the electrolyte at a controlled rate, whereas the rack and electromagnet are permitted to be raised rapidly by full energization of the motor. The motor 52 moves the rack 22 downwardly when relay 71 is energized to close its contacts, and upwardly when the contacts 74b and 74c are closed through energization of relay 74.

Electromagnet 50 is energized by closure of switch 64, with switch 73c of deenergized relay 73 in its normally closed position.

Heater 40 functions when switch 66 is closed, connecting it to transformer-rectifier unit 60.

Primary source terminals 68 are connected to a three-phase energy source (not shown). A master switch 70 in the supply leads controls application of power to the entire system. When this switch is closed A.C. energy is delivered to transformer-rectifier unit 60 as well as to the relay circuits.

Relay 67, energization of which is required in order to operate the system, is connected across supply leads 78 and 80 through normally closed push-button stopping switch 82 and normally open push-button starting switch 84, when the latter is momentarily pressed closed. Timer 73 is connected across supply leads 78 and 80 through normally open switches 67b of relay 67 and normally closed limit switch 54. Inasmuch as normally open switch 67a of relay 67 is then closed, as is switch 73a of timer 73, and these two are connected in series across switch 84, they thereby form a holding circuit for both the relay 67 and timer 73, so that the complete cycle of the timer 73 will then be self-executing once it is initiated (i.e., when limit switch 54 is closed).

Relay 72 is connected in parallel with timer 73, hence serially with relay switch 67b and limit switch 54 across supply leads 78 and 80. Relay 71 is connected serially with normally closed relay switch 72a and relay switch 67b across these supply leads. It will therefore be seen that relay switch 67b determines the action of the coils of relays 71 and 72 and of timer 73. Relay 71 is energized when relay 67 is energized (i.e., with the rack in its raised position). Only when limit switch 54 is actuated to the closed position in the downward movement of the rack 22, are the coils of relays 72 and of timer 73 energized. When this occurs, the opening of relay switch 72 deenergizes relay 71 and thereby opens the energizing circuit of motor 52. The rack movement is thereby terminated with the work piece immersed in electrolyte E. The final heating period is then initiated.

This heating period (i.e., from $t_4$ to $t_5$ in FIGURE 8) is terminated by timer 73. Completion of the timer cycle results in opening of timer switches 73a and 73c, and closing of timer switch 73b. This causes certain events in the system: (1) The electromagnet 50 is deenergized and the now heated work piece drops freely into the electrolyte for cooling purposes (i.e., tempering, annealing, etc.); (2) the relay 67 is deenergized, as is timer 73; (3) relay 74, energized through the momentarily closed switch 73b of timer 73, has now formed its own holding circuit through its holding switch 74a and the normally closed upper limit switch 56, connected serially across supply leads 78 and 80; and (4) the motor 52 is now energized for movement in the reverse direction through the closed switches 74b and 74c of relay 74 to raise the rack 22 and holding magnet 50. When the rack reaches its elevated position switch 56 is opened by arm 58, deenergizing relay 74 and thereby motor 52. The system is now restored to its original condition for a succeeding operating cycle which, as previously mentioned, is initiated by pressing push-button switch 84.

If at any time during the automatic cycle of operations it is desired to stop the operation, push-button switch 82 may be pressed, deenergizing relay 67.

Electrolyzing and heating power for operating the cell is produced by the direct-current generator 90 driven by the motor 92. The generator 90 has a field winding 94 which is energized by the motor-driven exciter 96 having its own excitation field 98. The generator field winding 94 is connected directly across the exciter armature 96 whereas the exciter field winding 98 is connected across the exciter armature through the two adjustable series resistances 100 and 102 and the switch 67c of relay 67. Resistance 100 is connected to the switch 72b of relay 72 to be by-passed by closure of this switch when the relay 72 is energized.

Normally relay switch 67c is opened so that no voltage is generated and thereby none is applied between the work piece W and liner electrode 12. Consequently, mere closure of master switch 70, which starts the motor 92, does not apply voltage to the cell, However, when push-button switch 84 is pressed, energizing relay 67 and closing relay switch 67c, reduced exciter voltage applied to the generator field 94 through the two series resistances 100 and 102 produces an initial electrolyzing voltage across the work piece W and the electrolyte E. This occurs at the same time the rack motor 52 is energized to initiate lowering of the work piece into the cell. The ensuing sequence of events including the variations of current flow through the cell represent the successive phases depicted from time=0 to time=$t_4$ in FIGURE 8. At time=$t_4$, represented in this case by actuation of the lower limit switch 54 and initiation of the timing period of timer 73, relay 72 is energized. Because relay switch 72a is connected serially with the motor control relay 71, when relay 72 is energized relay 71 is deenergized so as to terminate motor operation. Because relay switch 72b is connected across resistance 100 the latter is by-passed so as to apply full excitation voltage to the generator winding 94 and thereby full heating voltage to the cell when relay 72 is energized by the timer 73 at the end of the latter's cycle. Resistance 102 is adjusted so as to cause the correct value of excitation of the generator winding 94 to produce the desired heating voltage. By the same token, resistance 100 is adjusted so as to produce the desired initial electrolyzing voltage for application to the cell during the initial (i.e., first and second stages) of the total process.

Recapitulating and summarizing, the operation of the system shown in FIGURE 10 is as follows: Master switch 70 is closed, which starts the motor 92 and applies voltage to the energizing leads 78 and 80. Switch 64 is closed for energizing the electromagnet 50 in order to hold a work piece W on the lower end of the rack 22 with the rack in its elevated position. Heating lamp 40 is energized by closure of switch 66 in order to preheat the electrolyte surface. Downward movement of the rack and thereby of the work piece into the cell, attended by application of initial electrolyzing voltage between the work piece W and opposing electrode 12, is initiated by pressing the push-button switch 84, which energizes relay 67 and thereby energizes motor control relay 71. The motor 52 is thereby energized and the exciter field circuit switch 67c is thereby closed. Even though switch 84 is pressed momentarily, a holding circuit comprising relay switch 67a and timer switch 73a maintains energization of the relay 67. While the work piece W is being lowered at a predetermined rate (established by the setting of resistance 62), electrolyzing voltage is being generated and applied as described.

When the work piece is lowered to the desired limit in the electrolyte, the arm or dog 58 closes the limit switch 54, which energizes relay 72 and they deenergizes relay 71 by opening of relay switch 72a to stop the motor 52. It also closes relay switch 72b which by-passes resistance 100 and thereby results in application of full heating voltage by the generator 90 to the cell. Timer 73 is then actuated, by reason of closure of switch 54, which initiates the heating period. At the end of the heating period, the timer switches are actuated into the reverse positions from those shown in the figure, so as to deenergize the electromagnet 50 and thereby permit the work piece to drop down into the cell for cooling purposes. Also, attendant opening of timer switch 73a results in deenergization of relay 67 and thereby termination of voltage application by generator 90 to the cell. Attendant closure of timer switch 73b energizes relay 74 which forms a reversing circuit for the rack motor 52, i.e., through closure of switches 74b and 74c. At the same time, a holding circuit for relay 74 is formed through closure of its switch 74a, so as to permit the motor 52 to raise the rack and thereby the electromagnet to the upper limit position. When the upper limit position is reached switch 56 is opened, thereby deenergizing relay 74 and terminating energization of the motor 52. The system is now prepared for a succeeding cycle of operation.

FIGURES 11 and 12 illustrate another application of the invention and certain additional aspects thereof. In this case, the work piece Wa comprises a gear or other annular rotatable article, which is mounted on a suitable horizontal supporting shaft 106 carried by a hinged arm 108. The arm is mounted on a pivot shaft 110 intermediate its ends for raising and lowering the gear in relation to the electrolyte E in the container 10. The negative terminal of direct-voltage source 112 is connected to the arm 108 and thereby to the gear Wa to be heat treated, whereas the positive terminal of this source is connected to the liner electrode 12 of container 10. The gear Wa is slowly rotated by a speed reduction drive 114 acting through a belt 116 and pulleys 118 and 120 as shown.

A topping liquid I of an electrical and thermal insulating nature and of a lower specific density than the electrolyte (i.e. such as transformer oil, water glass, kerosene, etc.) is maintained on the surface of the electrolyte and is preferably of a depth which will cover a sufficient upper portion of the gear for cooling the latter as it emerges from the electrolyte E. Thus, as the gear slowly rotates, the lower portion thereof immersed in the electrolyte undergoes the process of heating heretofore described, whereas the upper portion thereof is immediately and continuously cooled in the cooler layer of topping liquid I. If desired, the topping liquid I and, for that matter, also the electrolyte E may be kept at a desired temperature through suitable control means of conventional or other types. The layer insulating liquid I also serves to prevent the electrolyte from evaporating and to contain heat in the electrolyte.

Consequently, by means of the apparatus shown in FIGURES 11 and 12, rotatable articles may be heated and cooled for heat treatment purposes in a single operation, that is, simultaneously.

FIGURES 13 and 14 illustrate a variation on the principle shown in FIGURES 11 and 12. In this case, a number of work pieces Wb are heat treated in direct succession by advancing them progressively first through the topping liquid I and into the electrolyte E for heating purposes, and then back out through the topping liquid I for cooling purposes. Parts which correspond to those in preceding figures bear similar reference numerals.

The individual work pieces Wb are suspended on conductive metal hooks or the like 122 on a conductive rope, chain or cable, etc., 124, which is guided by pulleys 126 and moved endwise of itself in an endless circuit by means of the drive motor unit 128. As the conductive cable moves over the tank 10 it droops and permits the work pieces Wb which is supports to move in a path which dips through the two layers of liquid for purposes of achieving the desired successive heating and cooling operations. The supporting cable 124, being conductive, serves as a conductor of electricity to connect the negative side of the direct-voltage source 112 to the work pieces Wb, whereas the positive side of the source 112 is connected to the liner electrode 12 as shown.

In the embodiment shown in FIGURE 15 arrangements are made for thermo-forging of a work piece Wc in a heating cell comprising the electrolyte container 10, the electrode 12, the heating lamp 40, the electrolyte E and the direct-voltage source 112 connected in the manner indicated to the work piece support and to the liner electrode. The work piece is supported on a vertically reciprocative hydraulic jack 130 which comprises a cylinder 130a, a piston 130b and a piston rod 130c having its lower end adapted to support the work piece. In line with the jack and mounted on the bottom of the electrolyte tank 10, electrically separate from the liner electrode 12, is a mold or die 132 which is shaped to the desired conformation for the finished work piece. A source of pressurized hydraulic fluid 134, is connected to the hydraulic jack cylinder in the manner indicated and is controlled by suitable means (not shown) in order to raise and lower the work piece in relation to the tank 10. The hydraulic jack is supported by suitable structural columns 136 and a rigid bridging member 138 interconnecting the upper ends of these columns, whereas the tank 10 and thereby the die 132 is supported by a lower bridging member 140 interconnected to the lower ends of the columns 136. The resultant structure has sufficient mechanical strength to withstand the reactive forces of the hydraulic jack pressing the work piece Wc into the die 132 for molding purposes.

Initially the work piece Wc is suspended in the electrolyte E by appropriate positioning of the hydraulic piston 130b within the cylinder 130a, and heating voltage from source 112 is applied to the work piece and the liner electrode 12. When the work piece reaches the desired working temperature, the hydraulic jack is actuated in order to press the work piece forcibly against the die 132. The heating voltage may be discontinued or continued as required in order to complete the thermo-forging operation. Repeated withdrawals and heating followed by applications to the die may or may not be necessary depending upon the extent of metal displacement required in the end result.

In the embodiment shown in FIGURE 16 a surgical instrument or other small metal tool or other article Wd is mounted in a metal holder 144 having an insulated covering handle 146 adapted to be grasped in the hand H and to be suspended thereby in the electrolyte E within container 10, with the liner electrode 12 connected to the positive side of the direct-voltage source 112. The holder 144, and thereby the work piece Wd, is connected to the negative side of the source. By immersion of the work piece Wd in the electrolyte with the voltage from source 112 applied in the manner indicated, the work piece soon becomes heated to a temperature (above 100° C.) sufficient to kill all bacteria and may then be cooled in the electrolyte E simply by disconnecting the direct-voltage source (through a switch not shown) preparatory to performing the surgical operation or other process requiring a disinfected and sterilized instrument. If desired, the cooling may take place in air, so that contamination from the electrolyte need not represent a problem. Of course, if cooling is to occur in the electrolyte, the electrolyte should be totally disinfected initially.

Referring to FIGURE 17, a technique and apparatus are disclosed for manufacturing alloy metals using two or more constituent metals. In this case, the different constituent metals M1 and M2 are fed in the form of rods down into the electrolyte E in a position overlying the molding crucible 148. In this instance, the direct-voltage source 112' comprises a source 112'a having its negative terminal connected to the rod M2, a separate source 112'b having its negative terminal connected to the rod M1 and a source 112'c having its negative terminal connected to the crucible. The voltage of source 112'a and 112'b may or may not be the same. Usually they will differ from each other, however, because of differences in melting temperatures of the component metals and because of a desire to control, by rate of melting, the relative percentage of metals in the final alloy. The voltage of source 112'c is chosen to be just sufficient to keep the alloyed metals in the molten state for purposes of removal or handling, as well as uniform admixture. The positive terminals of the three separate sources within the source 112' are connected to the liner electrode 12. The rods M1 and M2 are fed progressively into the bath and melted at the required relative rates until the desired quantity of each metal has been reduced to molten form by the heating process and mixed with the other metal in the common crucible. The rate of mechanical feed of the two rods ultimately controls the alloy ratio. Obviously, additional metals may also be incorporated at the same time and in the same manner.

It will therefore be seen that the invention has a number of applications and ramifications and that the illustrative embodiments thereof represent new and useful teachings in the art of heating by means of electrolytic action in the initial stage followed by gaseous-electric discharge in the final or stabilized heating stage. It will also be seen that the process furnishes a novel and more highly efficient means for heat treatment as well as other heating applications of metals out of contact with air, and it will be recognized by those skilled in the art that the invention has a number of modifications and variations within the scope of the novel concepts involved.

I claim as my invention:

1. In an electric discharge heat-treatment process wherein a metal work piece is immersed in an electrolyte and an electric current is passed through the electrolyte with the work piece as one electrode, at a sufficient voltage and for a sufficient time period to produce, in the latter stage of said process, gaseous-electric discharge heating through the gaseous blanket generated electrolytically and by volatilization at the work piece surface in the initial stages of said process, and thereafter terminating the current flow and allowing the work piece to cool in the electrolyte, the step of locally heating the surface layer of the electrolyte while maintaining the underlying electrolyte at a substantially lower temperature, and lowering the work piece gradually into the electrolyte through the surface layer thereof while passing current through the electrolyte with the work piece as an electrode to generate a layer of gas at the electrode surface without heating the electrode to a temperature higher than that produced in the latter stage of the process.

2. The process defined in claim 1, wherein the electrolyte surface is preliminarily heated by directing radiant heat against the same in the area through which the work piece is to be immersed.

3. The process defined in claim 1, wherein electrolyte from the body of electrolyte in which the heating is done is drawn off therefrom at a level beneath the heated surface layer, is passed through an external cooling circuit and is returned at a level substantially lower than said first-mentioned level.

4. In an electric discharge heating apparatus, a container for electrolyte, a first electrode in contact with electrolyte in said container, work piece supporting means to position a work piece immersed in the electrolyte, a voltage source connected for applying voltage between said electrode and said work piece, heating means positioned adjacent the surface of the electrolyte for heating the surface layer thereof to a temperature substantially above the underlying electrolyte, means including said supporting means operable for progressively lowering the work piece into the electrolyte with the source voltage applied, thereby to form a gaseous film electrolytically and by volatilization at the work piece surface, and means operatively associated with the voltage source for increasing said applied voltage to produce gaseous-electric discharge heating of the work piece with the work piece immersed in a selected position in said container.

5. The electric discharge apparatus as in claim 4, wherein the work piece supporting means comprises a meltable metal element also immersed in the electrolyte with the work piece immersed in said selected position, and subjected to melting and thereby disconnecting the work piece for dropping free in the electrolyte for cooling purposes after predetermined heating of the work piece therein.

6. The electric discharge apparatus as in claim 4, wherein the work piece supporting means comprises electromagnet means adapted when energized for supporting the work piece positioned in the electrolyte, and means connected to the electromagnet for energizing the same for a predetermined heating period and for terminating such energization at the end of such period.

7. The electric discharge apparatus defined in claim 4, further characterized by electrolyte cooling means including means for circulating the body of electrolyte which lies generally below said surface layer through said cooling means for maintaining said body of electrolyte at work piece cooling temperature.

8. In electric discharge heat-treatment apparatus, a container of electrolyte, positioning means for releasably suporting a work piece and for lowering the same progressively into the electrolyte, a first electrode in contact with the electrolyte, a voltage source having terminals connected respectively to said first electrode and to the work piece, said voltage source having a pre-determined initial electrolyzing voltage and being operable to produce an increased heating voltage, means for operating said positioning means to lower the work piece into the electrolyte with said electrolyzing voltage applied, a lower limit switch actuatable in response to predetermined positioning of the lowered work piece, a timer connected to be actuated by said limit switch for initiating a timed heating period, means connecting said timer to the voltage source to apply heating voltage to the work piece during said heating period, means connecting said limit switch to said positioning means to terminate lowering movement of the latter with actuation of said timer, means connected to be controlled by the timer upon termination of its timing period to operate the positioning means in the reverse direction and to remove the applied voltage, and further means connected to be controlled by the timer upon termination of its timing period to actuate the positioning means for releasing the work piece, whereby the latter drops into the electrolyte for cooling purposes while the positioning means rises for a succeeding cycle of operation.

References Cited by the Examiner

UNITED STATES PATENTS

| 852,732 | 5/07 | Luthy | 219—71 |
| 2,057,274 | 10/36 | Mayhew | 219—71 |
| 2,953,672 | 9/60 | Wisken et al. | 219—71 |

FOREIGN PATENTS 7,226  4/92  Great Britain.

OTHER REFERENCES

Electrical Review, June 10, 1893, page 209.

DAVID L. RECK, *Primary Examiner.*